(12) United States Patent
Gasser

(10) Patent No.: US 6,387,243 B1
(45) Date of Patent: May 14, 2002

(54) SEPARATION OF METAL IONS ABSORBED ON A RESIN AND INSTALLATION FOR RECYCLING PHOTOGRAPHIC EFFLUENTS INCLUDING AN EXCHANGER AND AN ELECTROLYTIC VESSEL

(76) Inventor: Gerard Gasser, 77 rue de Kingersheim, 68270 Wittenheim (FR)

( * ) Notice: Subject to any disclaimer, the term of this patent is extended or adjusted under 35 U.S.C. 154(b) by 0 days.

(21) Appl. No.: 09/459,898

(22) Filed: Dec. 14, 1999

Related U.S. Application Data (63) Continuation-in-part of application No. PCT/FR98/01242, filed on Jun. 12, 1998.

(30) Foreign Application Priority Data

Jun. 19, 1997 (FR) .............................................. 97 07812

(51) Int. Cl.⁷ ........................ B01D 15/08; B01D 17/06; C02F 1/46; G03C 5/00
(52) U.S. Cl. ...................... 205/687; 205/104; 205/105; 205/263; 205/744; 205/753; 205/771; 204/228.6; 204/229.4; 204/647; 430/398; 430/399; 430/400
(58) Field of Search ................................ 205/702, 771, 205/753, 755, 687, 571, 103, 744, 560, 341, 324, 586, 104, 102, 342, 751; 204/551, 229.4, 228.6, 263, 647, 273; 430/398, 400, 401

(56) References Cited

U.S. PATENT DOCUMENTS

| | | | | |
|---|---|---|---|---|
| 3,884,782 A | * | 5/1975 | Pittman et al. ............. | 204/108 |
| 3,910,833 A | * | 10/1975 | Knighton .................... | 204/273 |
| 4,159,930 A | * | 7/1979 | Degenkolb et al. .......... | 204/111 |
| 4,256,559 A | * | 3/1981 | Ono et al. ................ | 204/180 P |
| 4,330,386 A | * | 5/1982 | Korinek et al. ............. | 204/223 |
| 4,618,569 A | * | 10/1986 | Kurematsu et al. .......... | 430/428 |
| 4,744,825 A | * | 5/1988 | Chen et al. ................ | 75/118 R |
| 4,857,159 A | * | 8/1989 | Davis et al. ................. | 204/149 |
| 5,188,713 A | * | 2/1993 | O'Brien et al. ............. | 204/106 |
| 5,437,790 A | * | 8/1995 | Fyson et al. ................ | 210/710 |
| 5,453,348 A | * | 9/1995 | Kuse et al. ................. | 430/385 |
| 5,951,844 A | * | 9/1999 | Jansen et al. ............... | 205/571 |

FOREIGN PATENT DOCUMENTS

| | | |
|---|---|---|
| GB | 2 054 182 | 2/1981 |
| JP | 55 014849 | 2/1980 |
| JP | 58 055542 | 4/1983 |
| JP | 60 014240 | 1/1985 |

\* cited by examiner

Primary Examiner—Robert Dawson
Assistant Examiner—Michael J Feely
(74) Attorney, Agent, or Firm—Young & Thompson (57) ABSTRACT

A method for separating metal ions absorbed on a resin includes: suspending or percolating a cationic exchange resin charged with a polar solvent containing an eluting agent or a mixture of eluting agents containing at least an organic or mineral ligand complexing the metal ions to be separated; circulating a direct electric current, whether constant or not, in the charged eluting solution forming an electrolyte so as to recuperate at least a metal by deposition; and finally optionally repeating the last step by setting up one or several cathode(s) made of another metal and by re-adjusting the cathode potential and the anode/cathode potential difference to new values, depending on the new type of metal to be recuperated. An installation for treating/recycling photographic bath waste includes an exchanger connected to a tank for waste bath to be treated, to a treated waste bath tank, to a regenerating solution tank and to an electrolysis vessel.

21 Claims, 3 Drawing Sheets

SEPARATION OF METAL IONS ABSORBED ON A RESIN AND INSTALLATION FOR RECYCLING PHOTOGRAPHIC EFFLUENTS INCLUDING AN EXCHANGER AND AN ELECTROLYTIC VESSEL

This application is a continuation-in-part of international application PCT/FR98/01242 filed Jun. 12, 1998, which designated the united states.

FIELD OF THE INVENTION

The present invention relates to processes for recovering metals absorbed on a support of the resin type, in particular in the field of treatment and recycling of industrial effluents, in particular effluents resulting from photographic development, and concerns a process for separating and recovering metals absorbed on an ion-exchange resin and to a process and an installation for the treatment and recycling of at least some effluents of the aforementioned type, employing the aforementioned separation process.

BACKGROUND OF THE INVENTION

At present, cationic resins saturated by metal ions or a mixture of metal ions are generally regenerated by one of the following processes:

elution by an acid or a chelating agent with or without a chromatographic effect, regeneration in an electrolytic cell pumping of the ions by means of resin fibres and under the influence of an electrostatic field toward compartments which receive the concentrated saline solutions.

Now all the processes described hereinbefore yield concentrated metallic salt solutions which are generally mixed with one another and with other components or are optionally monometallic as the result of an expensive treatment necessitating significant investment costs.

Furthermore, the aforementioned processes are limited with regard to the obtaining of metals to those of which the normal oxidation-reduction potential is higher than or equal to −1.2 volts.

Moreover, various techniques are also currently known for treating these effluents, the most commonly used being precipitation, cementation, ion exchange, electrolysis, ultra-filtration and reverse osmosis, each of which is applied directly and independently of the other methods to the effluents to be treated, in particular to the bleaching/fixing baths loaded with silver.

The method of precipitation involves precipitating the silver ion using a sodium or potassium sulphide according to the equation:

$$2Ag^+ + S^{--} \rightarrow Ag_2S$$

This process definitively destroys the bath and produces silver sulphide which has to be recycled in silver metallurgy. This is achieved by carrying out "cupellation" during which the Ag is displaced by molten lead according to the reaction:

$$Ag_2S + Pb \rightarrow 2Ag + PbS$$

The lead is recovered by an extremely laborious complex thermal process commonly known as the "Pattinson process". This method is extremely toxic and problematic owing to the resultant environmental pollution.

For its part, cementation involves displacing the silver in solution with iron, which is electropositive, as follows

$$2Ag^+ + Fe \rightarrow 2Ag + Fe^{++}$$

This process is carried out by passing the solution to be desilvered into a cartridge containing iron or steel filings and is used mainly to desilver film washing water having a low silver content. A poor quality silver mixed with iron is obtained and the treated effluent is loaded with iron ions.

The ion-exchange method involves fixing the silver dithiosulphate complex present in the baths on an ion-exchange resin of the strongly basic type by exchanging silver dithiosulphate ions for chloride ions as follows:

$$3[[R]+Cl^-]+[Ag(S_2O_3)_2]^{---} \rightarrow 3[R]+[Ag(S_2O_3)_2]^{---}+3Cl^-$$

The silver is then eluted with a sodium thiosulphate or sodium chloride solution, and this eluate can be recycled in an electrolytic desilvering unit.

This process is particularly suitable for the treatment of film washing water or for finishing the desilvering of effluents already pre-desilvered by electrolysis and having low silver contents.

The main drawbacks of this process, as carried out at present are that:

the residual Ag content of the treated effluents often has a high dispersion, depending on the work regime of the development workshops, and the maximum levels of concentration in waste established by laws and regulations cannot always be guaranteed;

the effluents are loaded with chloride in proportion with the initial Ag content;

effluents originating from colour photographic processes containing ferric complexes such as iron III EDTA or ferrocyanide are also fixed and progressively poison the resin;

the anionic resins used cannot be recovered or reused;

the silver is not decomplexed relative to the thiosulphate and the treated bath never has a composition allowing it to be reused.

The electrolytic process involves depositing the Ag contained in the waste fixing or bleaching and fixing baths by direct electrolysis of these baths as follows:

$$Ag[(S_2O_3)_2]^{---} \leftrightarrows Ag^- + 2S_2O_3^{--}$$

$$Ag^+ + e^- \rightarrow Ag$$

This electrolytic process can be carried out according to different variations or applications mentioned hereinafter:

1) The electrolysis of fixing or bleaching and fixing baths with regeneration thereof involves carrying out partial desilvering to a minimum content of 1 g/l under a voltage limited to 1.3 V. Under these moderate electrolysis conditions, the deposited Ag is of good quality, the current efficiency is almost 100% and the bath is not decomposed and is recycled after addition of "regenerating" products which compensate the consumption of reagents by the irreversible reactions of the photographic process.

The volume of the bath increases as regeneration takes place, and the partially desilvered bath which is to be treated by a depolluting agent is periodically purged.

Furthermore, in the case of bleaching and fixing baths and owing to the presence of the Fe III EDTA complex in colour photographic processes, secondary reactions at the electrodes reduce the current efficiency.

In the best case, the recovery rate of the bath cannot exceed 60% as it is determined by the ratio between the average content at the inlet which is 2.5 g/l of Ag on average and that at the outlet limited by the process itself to 1 g/l.

The last evolutions of this method of direct electrolysis of the baths leads to desilvering with a minimal residual content of 0.5 g/l (still representing 20% of the initial content), produce waste in the form of graphite beads and are suitable only for the treatment of black and white photographic baths.

2) The electrolysis of fixing or bleaching baths leading to the destruction thereof ends with advanced desilvering (1 to 10 mg/l) by vigorous electrolysis at about 1.8 V. These vigorous conditions cause precipitation of Ag sulphide by decomposition of the thiosulphate. Precipitated $Ag_2S$ should be filtered after flocculation, and the decomposition of the thiosulphates also causes a release of toxic foul-smelling $H_2S$. Furthermore, $Ag_2S$ has to be treated again by the above-described method of precipitation.

3) Electrolytic desilvering of the washing water involves carrying out electrolysis in special apparatuses comprising a cathode consisting either of a stainless steel foam or of a stack of vibrated graphite beads having a very large active surface area, the anode being made of titanium. These devices, which yield silver contents <1 mg/l in the treated water, are also employed by depolluters in order to finish the desilvering of fixing or bleaching and fixing baths treated as described hereinbefore (in this case, the first desilvering operation by conventional electrolysis is limited to a content of 100 mg/l for economic reasons).

This process has the drawback of producing silver-covered graphite beads which, in turn, have to be treated.

Ultrafiltration and reverse osmosis are membrane-type processes employing modules containing semipermeable membranes of which the porosity is selected according to the substances to be eliminated. They necessitate relatively high working pressures and are suitable only for sparingly loaded water such as rinsing water, for example. Furthermore, their use necessitates very large, expensive technical means.

SUMMARY OF THE INVENTION

Thus, the first object of the present invention is to design a process for the separation and recovery of metals absorbed on an ion-exchange resin, for example after treatment of loaded effluents or of galvanoplastic baths not having the drawbacks or the limitations of currently known processes and, in particular, allowing different metals (for example, Au, Cu, Ag) saturating a, for example, cationic resin to be eluted selectively and to be recovered successively, in the order of increasing electronegativity or electropositivity, while not producing residues, in particular, of the heavy metal hydroxide type.

A further object of the invention is to provide a process and an installation for the treatment and recycling of at least some effluents resulting from photographic development with recovery of the silver present in the effluents, not having the drawbacks or the limitations of current processes, being able to treat sparingly loaded and highly loaded effluents equally well, yielding regenerated solutions which can be reused in photographic development in a quantity equivalent to the treated effluents, allowing almost all of the silver to be recovered and rejecting only minimal or almost zero quantities of final effluents.

Moreover, the process according to the invention should necessitate only limited investment and allow repeated reuse of the active substances involved in the treatment.

To this end, the invention relates firstly to a process for separating metal ions absorbed on an ion-exchange resin, characterised in that it involves suspending or percolating the preferably cationic resin loaded with a polar solvent containing an eluting agent or a mixture of eluting agents containing at least one organic or mineral ligand capable of complexing the metal ions to be separated, circulating a direct electric current, whether constant or not, in the eluting solution loaded with metal complexes or in the loaded mixture of resin and eluting solution forming an electrolyte between at least one cathode made of a metal identical to that of the metal ions to be recovered by deposition and at least one anode made of a material which is inert under the given physico-chemical conditions while keeping the cathode at an electric potential of which the value is slightly lower than the oxidation-reduction potential of the metal ion to be deposited during the active phases of deposition and finally repeating, if necessary, the last step by setting up one or more cathode(s) made of another metal and readjusting the cathode potential and the anode/cathode potential difference to new values depending on the new type of metal to be recovered.

Secondly, the invention relates to a process for the treatment and recycling of at least some effluents disposed of by photographic development laboratories and/or workshops, in particular waste photographic baths from fixing or bleaching and fixing, characterised in that it involves passing said effluents, in particular photographic baths and/or film washing water over a cationic ion-exchange resin which is selective relative to silver and capable of fixing it in the form of new complexes different from those present in said effluents, then regenerating said resin by elution of the silver in a regenerating solution containing a ligand capable of separating the silver from the resin and of binding it by complexing and, finally, carrying out, successively or simultaneously with regeneration, electrolysis of the loaded regenerating solution so as to recover the silver in metallic form.

Finally, the invention also relates to an installation for the treatment and recycling of fixing or bleaching and fixing baths and optionally photographic washing water intended, in particular, for carrying out the aforementioned treatment and recycling process characterised in that it consists mainly of at least one exchanger connected to a tank for waste bath to be treated, to a treated bath tank, to a regenerating solution tank and to at least one voltameter respectively, via corresponding pipes equipped with shut-off members and, if necessary, means for the active transfer of appropriate liquids, all of said members and transfer means being monitored and controlled by a central control unit.

BRIEF DESCRIPTION OF THE DRAWINGS

The invention will be understood better by means of the following description which relates to preferred embodiments given as non-limiting examples and explained with reference to the accompanying schematic drawings in which.

DETAILED DESCRIPTION OF THE INVENTION

According to the invention, the process for separating metal ions absorbed on an ion-exchange resin involves suspending or percolating the preferably cationic resin loaded with a polar solvent containing an eluting agent or a mixture of eluting agents containing at least one organic or mineral ligand capable of complexing the metal ions to be separated, circulating a direct electric current, whether constant or not, in the eluting solution loaded with metal complexes or in the loaded mixture of resin and eluting solution forming an electrolyte between at least one cathode made of a metal identical to that of the metal ions to be recovered by deposition and at least one anode made of a material which is inert under the given physico-chemical conditions while keeping the cathode, during the active phases of deposition, at an electric potential of which the value is slightly lower than the oxidation-reduction potential of the metal ion to be deposited and finally repeating, if necessary, the last step by setting up one or more cathode(s) made of another metal and readjusting the cathode potential and the anode/cathode potential difference to new values depending on the new type of metal to be recovered.

It is therefore possible successively to recover several different metals fixed on a same resin used for the treatment of liquids loaded with ions and/or metal complexes.

The treated and regenerated cationic or anionic resin could have the form either of a semiliquid substance which can be mixed with the regenerating eluting solution or of a substance fixed on a solid substrate over which the effluents or baths to be treated are passed by percolation.

According to a first characteristic of the invention, the constant potential difference between anode(s) and cathode (s) during the phases of active electrolysis with deposited metal, is close in value to the limit value for the conduction of the electrolyte formed by the eluting solution loaded with metal complexes or by the mixture of resin and loaded eluting solution, the electric current applied having a double alternation rectified, square, triangular, rectangular or pulsed direct form.

These aforementioned forms of modulated currents allow the rate of progress of electrolysis to be adjusted to the rate of progress of the reactions associated with elution, thus making the process more economical and avoiding degradation of the complexing agent or ligand during electrolysis.

Advantageously, the polar solvent used has a dielectric constant of between 24 and 120, and the preferably cationic resin consists of a resin of the type selected from the group formed by weakly or strongly acidic resins and zeolites, said separation and recovery process being carried out at a temperature of between −30° C. and +300° C., preferably between +20° C. and +200° C. and optimally between +20° C. and +90° C.

According to a preferred embodiment of the invention, the electric current applied to the electrodes is amplitude modulated as a function of the time and ends with discontinuous electrolysis comprising phases of stoppage of metal deposition during which the potential applied to the cathode or cathodes is just higher than the equilibrium potential of the voltameter containing the electrolyte formed by the mixture of resin and eluting solution, alternating with active phases of deposition during which the potential of the cathode or cathodes is brought to a value corresponding to that of the apparent level of diffusion of the complexes to be electrolysed and containing the metal ions to be recovered, preferably to a value situated substantially in the centre or at the end of said level, the durations and the ratios of the durations of the two phases being determined in such a way that electrolysis is synchronised with the elution reaction.

This method of electrolysis, namely with a modulated current, leads to a very good surface state of the deposited metal, to high current efficiency and to the almost total absence of decomposition of the electrolyte.

The elution/regeneration and electrolysis operations can be carried out either simultaneously, in particular by electrolysis with a modulated current as described hereinbefore, or successively, electrolysis not commencing until after completion of elution.

The process described hereinbefore leads, in particular, to high selectivity in the separation of the metals, to a very good surface state of the deposited metal, to very high purity and to a very good surface state of this deposit, to high current efficiency and to the almost complete absence of decomposition of the electrolyte, and to optimum use in terms of efficiency of the installation used for the treatment under consideration.

The selectivity of the separation process according to the invention could consequently be adjusted by acting on four parameters or factors, namely the nature and the characteristics of the resin and of the eluting agent or of the mixture of eluting agents, the characteristics of the membrane of the voltameter and the characteristics of the potentials and electrolytic currents as well as their development over time.

The invention also relates to a process for the treatment and recycling of at least some effluents disposed of by photographic development laboratories and/or workshops, in particular waste photographic baths from fixing or bleaching and fixing, in particular of the type known by KODAK's designation RA4.

This treatment and recycling process with recovery of the silver in metallic form essentially involves passing said effluents, in particular photographic baths and/or film washing water over a cationic ion-exchange resin which is selective relative to silver and capable of fixing it in the form of new complexes different from those present in said effluents, then regenerating said resin by elution of the silver in a regenerating solution containing a ligand capable of separating the silver from the resin and of binding it by complexing and, finally, carrying out, successively or simultaneously with regeneration, electrolysis of the regenerating solution so as to recover the silver in metallic form.

The operations of regeneration/elution and electrolysis can be carried out advantageously, for example, as described hereinbefore in relation to the aforementioned separation process.

In order to optimise, on the one hand, the fixing of the silver ions by the cationic resin during the desilvering operation in such a way that said resin operates in conditions favourable to solid fixation and, on the other hand, the liberation of the silver ions from said resin and the complexing thereof by the eluting solution during the resin regeneration operation, the silver is advantageously fixed by the resin in a basic medium and said resin is regenerated in an acidic medium, the resin/silver complex being stable or very stable in an alkaline medium and sparingly stable in an acidic medium.

To this end, the pH of the bath or of the treated water may be adjusted, on the one hand, prior to passage over the ion-exchange resin, by addition of a base, for example $NH_4OH$, to a value between 8 and 10, preferably of about 9 and, on the other hand, after passage over the ion-exchange resin and prior to recycling (around 5 to 6), to its initial value prior to treatment, by addition of a mineral or organic acid which does not affect the components of the effluents or baths to be recycled and does not reduce the metal to be recovered such as, for example, $H_2SO_4$, HCl or $CH_3COOH$, the agitating in presence of air, during acid rejustment of the pH, leading to reoxydation of the FeII/EDTA complex into FeIII/EDTA complex (thereby achieving the regeneration of the bleaching/fixing bath)

According to a preferred embodiment of the invention, the resin used is a weakly acidic cationic resin formed by a polymeric substrate carrying thiol functions, strong acid functions and/or functions containing nitrogen and sulphur atoms as electron donors such as 1,3-diphenyl-2-thiourea, 2-mercaptobenzimidazole or p-dimethyl-aminobenzylidene rhodamine groups.

The basic substrate could have a macroporous structure and be formed from polystyrene crosslinked with divinyl benzene (DVB).

Alternatively, said resin could also be formed by a substrate based on m-aminophenyl polymers carrying dithiocarbamate groups.

However, the cationic resin used should very selectively fix only the silver ions and should not react significantly with the other components of the baths or water to be treated.

As examples, the cationic resin used could be of the type known by the name Imac TMR or Imac GT73 sold by the company ROHM & HAAS.

Figure 1:
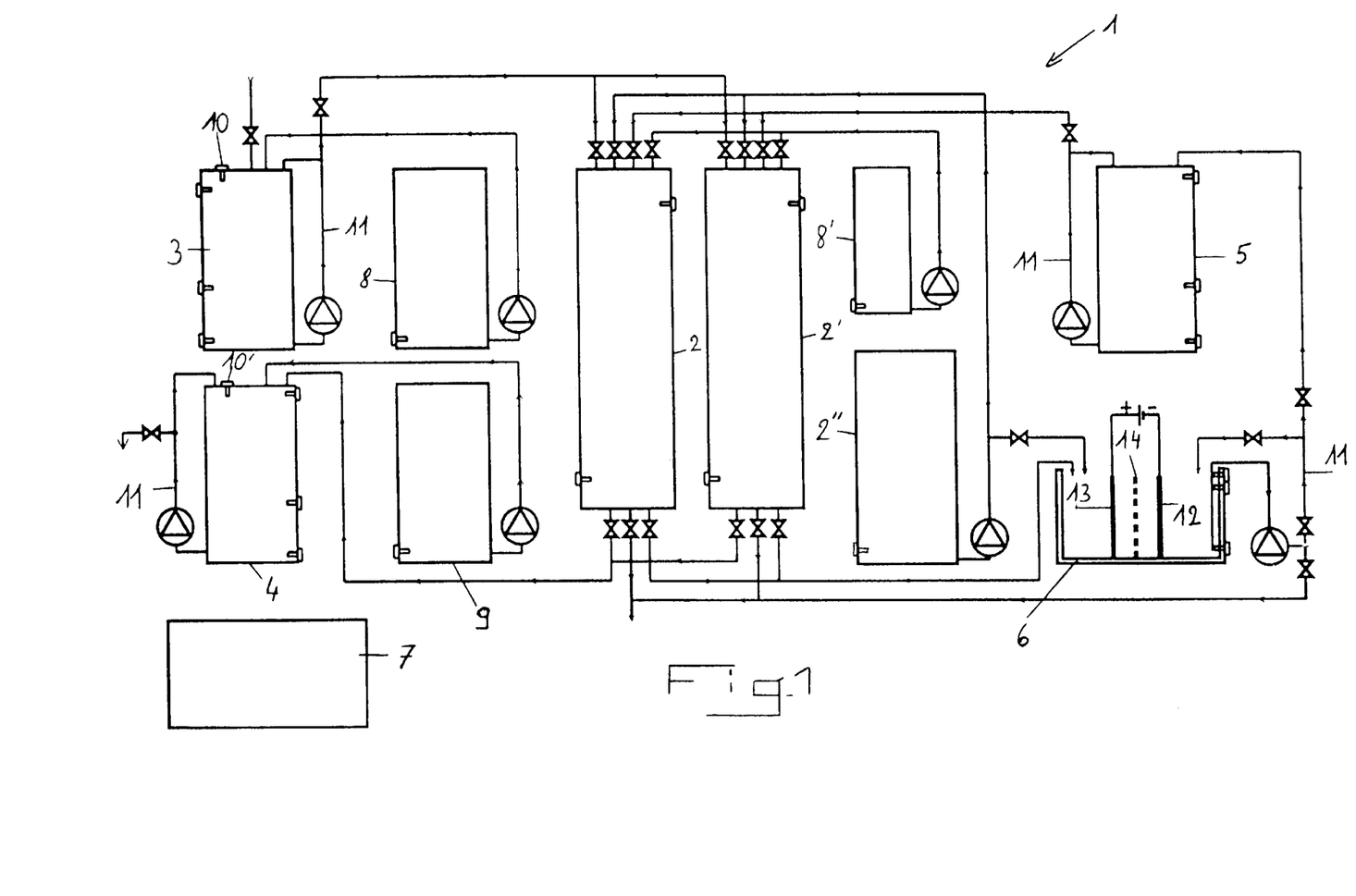
FIG. 1 is a block diagram of an installation according to the invention comprising two ion exchangers.
Figure 2:
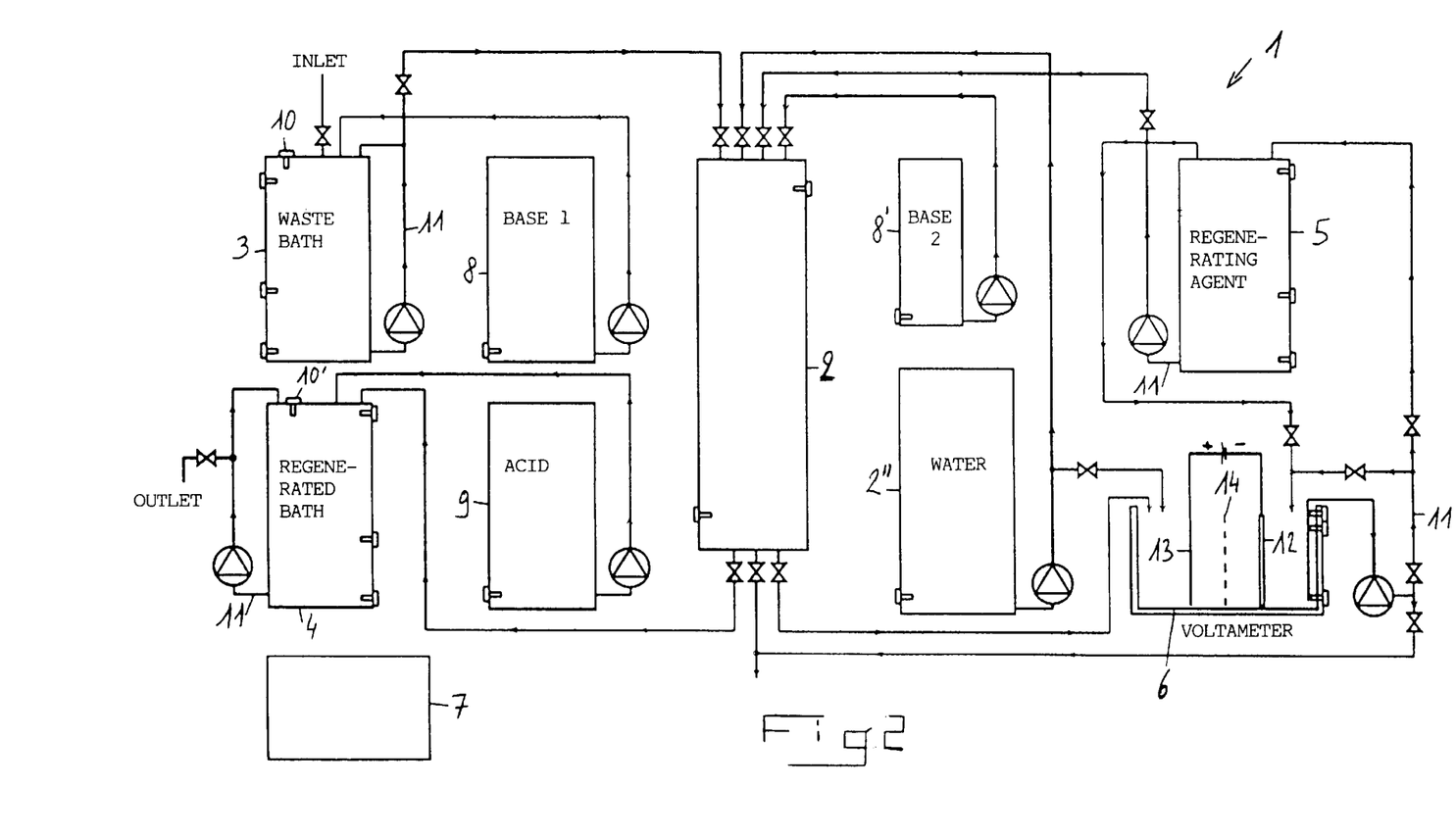
FIG. 2 is a block diagram of an installation according to the invention comprising one ion exchanger.

As shown in FIGS. 1 and 2 of the accompanying drawings, the operations of desilvering the waste bath or the washing water and of regenerating the resin with the regenerating solution are carried out by successive percolations over said resin in the same container 2, 2'.

In order to optimize the performance of the cationic resin, the cationic resin is advantageously preneutralised by a strong base with a pH of between 8 and 10, preferably by $NH_4OH$ to a pH of about 9, this base also being used to adjust the pH of the waste bath prior to passage over the resin. However, the base used can consist more generally of any mineral or organic base such as NaOH, KOH, the amines (for example, ethanolamine), the substituted aminated bases (for example, tetrabutylammonium hydroxide), the strong organic bases (for example, lysine) or again pyrinidine-containing bases (for example pyridine).

According to a characteristic of the invention, during the regeneration phase, the pH of the regenerating solution may be at most equal to 4, this solution containing an acid which does not react with the ligand or complexing agent present in said regenerating solution and not dissolving the silver in metallic form.

For example, a mineral acid such as concentrated (32%) HCl or dilute (0.1 N) or 32% $H_2SO_4$ could be used. However, it is also possible to use either an organic acid having an adequate $pK_a$ (for example acetic acid) or mixtures of mineral and organic acids defined in order to facilitate the solubility of the complexes formed.

The complexing agent or ligand contained in the regenerating solution can consist of any mineral or organic ligand forming, in an acidic medium, one or more complexes with the silver of which the structure is more stable than that of the silver/resin complex.

The complexing agent or ligand, or mixture of complexing agents or ligands, used should selectively fix the silver ions and should not react or should react very slightly with the other compounds or substances present in the exchanger or exchangers during the regeneration phase.

Preferably, the ligand or complexing agent present in the regenerating solution is selected from the group formed by thiourea, thiamine and HCl, the concentration of ligand molecules or complexing agent being such that a ratio (ligand molecules/silver molecules) higher than about 4 is obtained.

It will be noted that, by using HCl as ligand, the ligand simultaneously acts as the acid during regeneration of the resin.

In general, the ligand or complexing agent should be used in a large excess relative to the metal (silver) since complexes containing few ligands in the molecule (for example two per metal atom) are formed first of all and it has been found in practice that the solubility of these chemical entities is relatively low in the regenerating solutions used whereas they dissolve easily in an excess of complexing agent owing to the formation of complexes containing a larger number of ligands in the molecule (for example four ligands per metal atom).

A practical example of a regenerating solution is a regenerating solution containing between 30 and 35%, preferably about 32% (by weight), of $H_2SO_4$ and between 10 and 20%, preferably about 15% (%/weight/volume) of thiourea in a volumetric ratio of 4/1 for the volumetric ratio of regenerating agent to resin.

The regeneration and electrolysis operations are carried out at temperatures of between 30° C. and 50° C., preferably between 30° C. and 40° C. in order to obtain a maximum reaction rate and optimised efficiency.

Furthermore, electrolysis is preferably carried out at a pH of between 0 and 5, preferably between 0 and 1, with vigorous stirring in a laminar or turbulent flow in a protective atmosphere if an air-sensitive ligand or complexing agent is used and while monitoring the variation in the electrolytic current in order to record its drop below a predetermined threshold value leading to the stoppage of electrolysis (so-called "chronoamperometry" method).

In order to tend toward almost zero waste or at least toward non-polluting waste, the washing or rinsing water resulting from the desilvering operation, as well as the film washing water which has been subjected to a desilvering operation may be treated by increasing their pH to 12 or higher, for example by addition of sodium hydroxide and hydrogen peroxide, then filtering and, finally, reestablishment of their pH to about 7.

The hydrogen peroxide or similar substance will preferably not be added until after adjustment of the pH of the water in a range of between 5 and 7, followed by a waiting period.

The waste water resulting from the desilvering operation is therefore completely desilvered in a first phase by passage over the ion-exchange resin at the beginning of the following treatment cycle and is then purged down the sewer after having been brought to a pH higher than 12 by addition of NaOH (to precipitate the iron present in the form of ferric hydroxide), filtered and brought back to a pH of about 7 by addition of HCl. The iron/EDTA complex is therefore destroyed and a proportion of the sulphates and acetates capable of accumulating with repetition of the process is simultaneously eliminated.

The film washing water, for its part, is subjected to a desilvering operation after adjustment of its pH and preneutralisation of the resin.

Almost all of the silver present in this water is fixed and the content thereof falls below 0.04 ppm, allowing said water to be put in the sewer.

To avoid the disposal of water having a high COD and containing the non-biodegradable iron/EDTA complex, the aforementioned desilvering operation can be followed by the above-described complementary treatment for washing and rinsing water resulting from the desilvering operation by adding, prior to precipitation of the iron, an oxidising agent such as hydrogen peroxide or sodium peroxidisulphate in a stoichiometric quantity relative to the COD and by heating said water to a temperature of between 30° C. and 90° C.

It is also possible, in order to avoid the disposal of film washing water and completely to recycle it, to follow the aforementioned treatments by the passage of said treated water over an anionic exchanger then over a cationic exchanger, before reusing it for the washing of films.

To maintain the required mineralisation, it is desirable to add a metered quantity of untreated drinking water from the mains. Furthermore, by isolating the containers forming anionic and cationic exchangers, it is also possible to recover a large proportion of the calories carried by said washing water (about 70% by the setting up of a heat exchanger on a recirculation circuit).

Similarly, the water for rinsing or washing the resins and the corresponding containers after regeneration are treated by evaporation under vacuum in order to obtain a residual solution having a silver concentration substantially equivalent to that of the regenerating solution containing the silver in the eluted state after passage over the loaded resin, said residual solution then being treated by electrolysis and the distilled water obtained during the phase of concentration by evaporation being reinjected into a rinsing and washing water storage tank and being re-used for the washing of said container (exchanger 2, 2' and electrolytic tank 6).

Finally, the invention also relates to an installation for the treatment and recycling of fixing or bleaching and fixing baths and optionally photographic washing water intended, in particular, for carrying out processes as described hereinbefore and illustrated in FIG. 1 and 2 of the accompanying drawings.

This installation 1 is characterised in that it consists mainly of at least one column-exchanger 2, 2' connected to a tank 3 for waste bath to be treated, to a treated bath tank 4, to a regenerating solution tank 5 and to at least one voltameter 6 respectively, via corresponding pipes equipped with shut-off members and, if necessary, means for the active transfer of appropriate liquids, all of said members and transfer means being monitored and controlled by a central control unit 7.

It will be noted in the accompanying figures that the various containers 2, 2', 2", 3, 4, 5, 6, 8, 8' and 9 are each provided with low and high level detectors and optionally with intermediate level detectors allowing reliable management of the filling of said containers as well as transfers of liquids between them.

According to a characteristic of the invention shown in FIGS. 1 and 2 of the accompanying drawings, the waste bath tank 3 is fed with base from a corresponding container 8 and the treated bath tank 4 is fed with acid from a corresponding container 9, the actuations of the shut-off members and, if necessary, the transfer means monitoring the supply of base or of acid to said tanks 3 and 4 being controlled by one or more respective modules for regulating the pH 10, 10', which continuously record the pH of said tanks 3 and 4.

As also shown in FIGS. 1 and 2 of the accompanying drawings, the exchanger or exchangers 2, 2' are also connected to a rinsing or washing water tank 2", the waste bath, treated bath and regenerating solution tanks 3, 4 and 5 as well as the voltameter 6 being provided with closed loop recirculation circuits 11.

Furthermore, an additional tank 8' for storing the base used for preneutralisation of the resin can also be provided.

If the regeneration of the resin and electrolysis are carried out in two separate successive stages, a supplementary storage tank can be added for the silver-saturated regenerating solution (not shown). A closed loop circuit is therefore established between this supplementary tank and the voltameter 6 during electrolysis, until all the dissolved silver has been extracted, the regenerated regenerating solution (that is freed of silver) then being transferred to the active regenerating solution storage tank 5.

Furthermore, the entire installation 1 could be arranged on a frame simultaneously forming a holding tank and comprising a compartmentalised protective box containing the various functional components of said installation.

The progress of the three stages of the treatment and recycling process according to the invention will be described more precisely hereinafter with reference to the accompanying FIG. 1 or 2.

The waste bath or the recovered film washing water, in a first stage, is stored in a tank 3 in which its pH is adjusted to an alkaline value by addition of base originating from the container 8.

The Fe III/EDTA complex is reoxidised by contact with air, promoted by turbulence generated in the tanks 3 and 4 equipped with recirculation circuits 11.

During the passage of the waste bath or of the water to be treated over the ion exchange resin in the exchanger or exchangers 2, 2', an electrochemical sensor detects the appearance of the first traces of silver at the outlet of the resin or of the exchanger or exchangers, leading to the stoppage of percolation of the resin, and triggers the washing thereof with the rinsing water issuing from the tank 21".

This rinsing necessitates virtually no disposal of non-biodegradable substances owing to the above-described treatment of the water and allows the process to operate with a virtually constant volume, the adjustment of the pH upstream and downstream of said process, as well as compensation for the losses of sulphites and thiosulphates causing only an increase in volume of about 6% of the regenerated bath relative to the waste bath.

After rinsing of the resin, regenerating and eluting solution is transferred into the exchanger or exchangers 2, 2', said solution liberating said resin of the silver ions fixed thereon during its passage by percolation through said resin.

Comparison of FIGS. 1 and 2 of the accompanying drawings shows that the installation 1 can comprise either a single exchanger 2 or two exchangers 2 and 2', depending on the envisaged mode of operation.

In the presence of a single exchanger, regeneration of the resin is separated in time from the electrolysis of the regenerating solution loaded with silver.

In this case, a regenerating solution highly concentrated in acid and in complexing agent is circulated through the exchanger 2 in a quantity sufficient to elute all the silver fixed on the resin contained in said exchanger 2.

"Front chromotography" is therefore created in the exchanger 2, in which the peak of elution is very straight since the silver is flushed in line in front of the wave of eluting agent injected into said exchanger 2 (in practice: observation of an Ag front gradually passing over the entire length of the exchanger).

When all the silver has been eluted, the regenerating solution is transferred into a supplementary storage tank (not shown) while proceeding as described hereinbefore.

The exchanger 2 is then washed with water to clean the residues of silver complex, acid and excess complexing agent from the resin, this washing water then being treated as mentioned hereinbefore and the resin being able to be reconditioned for a new operation of desilvering waste bath or film washing water.

This mode of operation allows the exchanger 2 to be put back into service very quickly, allows electrolysis to be carried out separately without the need for synchronisation and with investment costs limited to a single exchanger.

With two exchangers 2 and 2' (FIG. 1), the operations of regeneration of the resin and recovery of the silver by electrolysis are carried out simultaneously, the regenerating solution circulating between the exchangers 2 and 2' and the voltameter 6 in which the silver is deposited as it is eluted. At the end of these operations, determined by monitoring the chronoamperometric parameters of electrolysis, the various containers are washed as mentioned hereinbefore.

This second embodiment with two exchangers has the advantage of providing a continuously operating installation 1, wherein one of the exchangers can always be in the desilvering phase whereas the other is in the regenerating phase.

Furthermore, there is more time to carry out electrolysis and it is not necessary to have a regenerating solution with a high concentration of acid and complexing agent.

Furthermore, as electrolysis is never interrupted, a better quality of deposited metal is obtained.

Figure 3:
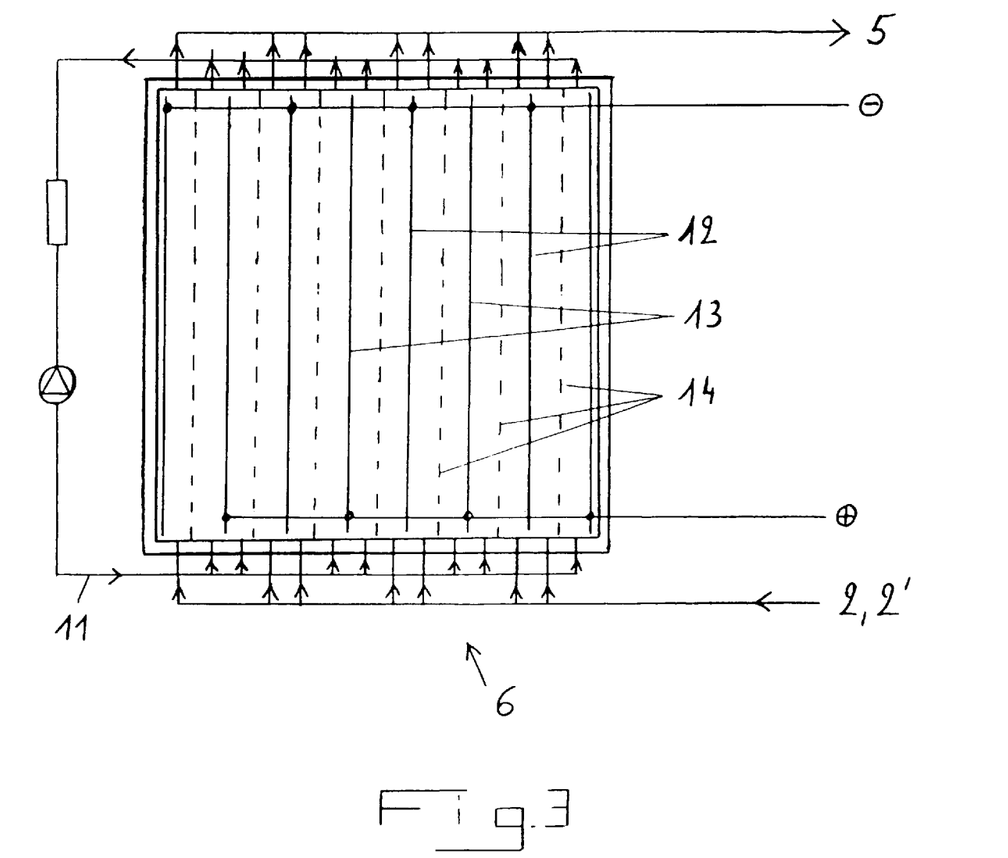
FIG. 3 is a plan view (after removal of its lid) of a voltameter forming part of the installation shown in FIG. 1 and 2.

The voltameter 6 in which electrolysis is carried out consists, for example, of a tank made of a material which is resistant to the various components of the electrolyte, preferably of a chemically inert plastics material in which the cathodes 12 and anodes 13 are arranged alternately.

Advantageously, said cathodes 12 of the voltameter consist of thin sheets of silver, and the anodes 13 of plates of graphite, said alternate electrodes being mutually spaced by about 3 to 15 mm, preferably about 8 mm and being separated, in the region of each pair of opposing electrodes 12, 13, by a diaphragm 14 in the form of an ion-exchange membrane of the cationic type, the compartment or compartments containing the anode or the anodes 13 being filled with a strongly acidic solution.

This last arrangement avoids degradation of the complexing agent and of the complex dissolved in the electrolyte-forming regenerating solution (by electrostatic migration toward the anode) and therefore excessive energy consumption, a metal deposit of mediocre quality, overconsumption of complexing agent and soiling of the voltameter 6.

With regard to the physical conditions for carrying out electrolysis, it should be noted that electrolysis is advantageously carried out at a temperature of between 10° C. and 60° C., preferably between 30° C. and 40° C., with a current density at the beginning of electrolysis of between 0.05 and 3 $A/dm^2$, preferably between 0.2 and 0.5 $A/dm^2$, with a pH of the electrolyte of between 0 and 5, preferably between 0 and 1 and with laminar or turbulent agitation of said electrolyte.

The anodic compartments formed by the diaphragms 14 can preferably be filled with 32% sulphuric acid whereas the cathodic compartments contain the regenerating solution loaded with silver.

According to a further characteristic of the invention, it is possible to divide the installation 1 into two localised portions at distinct positions, namely a first desilvering unit to be installed at photographers or developers and a second regeneration and electrolysis unit installed at a specialised sub-contracting company.

This structure of the installation limits investments, handling and maintenance by photographers and developers and allows the cost of regeneration to be reduced owing to large-volume treatment, this highly technical operation also necessitating highly skilled staff.

Owing to the invention, it is possible to embody a process and an installation for the treatment and recycling of a photographic bath and of film washing water generating very little wastage, of which the yields are much higher than those of existing processes and which lead to recovery rates of about 100% in the case of silver, of about 94% in the case of thiosulphates, of about 100% in the case of sulphates and of about 90% in the case of Fe III/EDTA complex.

These results obtained with the process according to the invention are due, in particular, to the specific choices of active compounds (in particular resin and regenerating solution) and the modes of operation employed and to the high selectivity existing at each stage of the process (desilvering, regeneration, electrolysis).

It has also been found, during repeated tests, that the fixing capacity of the resin used (operating capacity and total capacity) is virtually unaffected after ten consecutive desilvering cycles.

Furthermore, photometric tests carried out on a bleaching/fixing bath of the RA4 type which has been subjected to ten regenerations by means of the process according to the invention have shown that this bath satisfied the standards and allowed the development of high quality photographs which are stable over time.

The invention is obviously not limited to the embodiments described and illustrated in the accompanying drawings. Modifications are possible, in particular with regard to the composition of the various elements or by substitution of technical equivalents, without departing from the scope of protection of the invention.

What is claimed is:

1. Process for separating metal ions absorbed on a cation exchange resin, which comprises:

contacting the cation exchange resin with a polar solvent containing an eluting agent or a mixture of eluting agents containing at least one organic or mineral ligand capable of complexing the metal ions to be separated so as to obtain an eluting solution charged with metal complexes;

circulating a direct electric current in a voltameter containing the eluting solution charged with metal complexes thereby forming an electrolyte between at least a first cathode made of a first metal identical to that of the metal ions to be recovered by deposition, and at least one anode with a given electric potential while keeping the cathode at an electric potential having a lower value than the oxidation-reduction potential of the metal ion to be deposited during deposition; and finally setting up at least a second cathode made of a second metal and readjusting the cathode electric potential and the anode electric potential to provide a desired anode/cathode potential difference corresponding to new values depending on the second metal to be recovered; the electric current applied to the electrodes being amplitude modulated as a function of time and ending with discontinuous electrolysis comprising phases of stoppage of deposited metal during which the potential applied to the cathode or cathodes is greater than the equilibrium potential of the electrolyte, alternating with active phases of deposition during which the potential of the cathode or cathodes is brought to a value corresponding to that of the apparent level of diffusion of the complexes to be electrolyzed and containing the metal ions to be recovered; the durations and ratios of the durations of the two phases being determined in such a way that electrolysis is synchronized with the elution reaction.

2. The process according to claim 1, wherein the value of the potential difference between anode and cathode approximates the limit value for the conduction of the electrolyte formed by the eluting solution charged with metal complexes and the electric current applied is a double alternation rectified, square, triangular, rectangular or pulsed direct current.

3. The process according to claim 1, wherein the polar solvent has a dielectric constant of between 24 and 120; the cation exchange resin is a resin selected from the group consisting of weakly or strongly acidic resins and zeolites; and said process is carried out at a temperature of between −30° C. and +300° C.

4. The process according to claim 1, wherein during the active phases of deposition, the potential of the cathode or cathodes is brought to a value situated substantially at the middle or at the end of the apparent level of diffusion of the complexes to be electrolyzed and containing the metal ions to be recovered.

5. Process for the treatment and recycling of an effluent rejected by waste photographic baths from fixing or bleaching and fixing comprising an FeII/EDTA complex, which comprises:

passing said effluent over a weakly acidic cation exchange resin comprising a polymeric substrate carrying thiol functions, acid functions, and/or functions containing nitrogen and sulphur atoms as electro n donors, to obtain a treated water;

said cation exchange resin being selective relative to silver and capable of fixing said silver by forming new complexes different from those present in said effluent;

then regenerating said cation exchange resin by elution of the silver with a regenerating solution containing a ligand capable of separating the silver from the resin and of binding it by complexing; and finally carrying out successively or s imultaneously with regeneration, electrolysis of the regenerating solution so as to recover the silver in metallic form; the operations of regeneration/elution and of electrolysis being carried out by the separation process according to claim 1 resulting in a resin rinsing or washing water.

6. The process according to claim 5, wherein the fixing of the silver by the resin is carried out in a basic medium and the regeneration of said resin is carried out in an acid medium; the resin/silver complex being very stable in an alkaline medium and sparingly stable in an acidic medium.

7. The process according to claim 5, further comprising adjusting the pH of the effluent prior to passage over the cation exchange resin to a value between 8, and 10 by adding a base; and readjusting the pH of the treated water after passage over the cation exchange resin and prior to recycling, to a value of about 5 to 6 by adding an acid which does not affect the components of the effluent to be recycled and does not reduce the metal to be recovered; the readjusting being carried out with agitation in the presence of air and leading to an oxidation of FeII/EDTA complex into FeIII/EDTA complex.

8. The process according to claim 5, wherein the weakly acidic cationic exchange resin is one of 1,3-diphenyl-2-thiourea, 2-mercaptobenzimidazole, and p-dimethyl-aminobenzylidene rhodamine.

9. The process according to claim 5, wherein the substrate has a macroporous structure and is formed from polystyrene crosslinked by divinylbenzene (DVB).

10. The process according to claim 5, wherein the resin is formed by a substrate based on m-aminophenol polymers carrying dithiocarbamate groups.

11. The process according to claim 5, wherein the resin is preneutralized with a base to a pH of between 8 and 10.

12. The process according to claim 5, wherein the operations of fixing the silver and regenerating the resin with the regenerating solution are carried out by successive percolations over said resin in a same container.

13. The process according to claim 5, wherein during regeneration, the pH of the regenerating solution is at most equal to 4; said regenerating solution containing an acid which does not react with the ligand present in said regenerating solution.

14. The process according to claim 5, wherein the ligand present in the regenerating solution is selected from the group consisting of thiolurea, thiamine and HCl; the concentration of ligand molecules being such that a ratio of ligand molecules to silver molecules greater than about 4 is obtained.

15. The process according to claim 5, wherein the regeneration and electrolysis operations are carried out at temperatures ranging between 30° C. and 50° C.

16. The process according to claim 5, wherein the electrolysis is carried out at a pH of between 0 and 5, while monitoring a variation in the electrolysis current in order to record a drop thereof below a predetermined threshold value, wherein said drop signals for the stoppage of electrolysis.

17. The process according to claim 5, further comprising increasing the pH of washing or rinsing water resulting from the fixing operation to at least 12 by adding sodium hydroxide and hydrogen peroxide, then filtering, and finally reestablishing the pH to about 7.

18. The process according to claim 5, further comprising evaporating under vacuum resin rinsing or washing water after regeneration so as to obtain distilled water and a residual solution having a silver concentration substantially equivalent to that of the regenerating solution containing the silver in the eluted state; then subjecting said residual solution to electrolysis; and forwarding the distilled water to a storage tank as rinsing and washing water.

19. An installation for the treatment of an effluent rejected by photographic waste baths, comprising:

a water tank for storing the effluent to be treated;

at least one cation exchanger containing a weakly acidic cation exchange resin comprising a polymeric substrate carrying thiol functions, acid functions, and/or functions containing nitrogen and sulphur atoms as electron donors, to obtain a treated water;

said cation exchange resin being selective relative to silver;

said cation exchanger being fluidly connected to said waste water tank, to a treated water tank, to a regenerating solution tank, and to a voltameter respectively via corresponding pipes equipped with shut off members;

transfer means for transferring liquids;

a central control unit operatively associated to monitor and control all of said members and transfer means;

said voltameter comprising a plurality of cathodes and anodes arranged alternatively;

said cathodes comprising thin sheets of silver and said anodes comprising graphite plates;

said alternate cathodes and anodes being mutually spaced by about 3 to 15 mm, and separated in the region of each pair of opposing electrodes by a cation exchange membrane; and means for filling a compartment containing the anodes with an acidic solution.

20. The installation according to claim 19, further comprising a base tank for feeding the waste water tank with base; and an acid tank for feeding the treated water tank with acid; the acuations of the shut off members and the transfer means monitoring the supply of base or of acid to said tanks being controlled by one or more respective modules for regulating the pH, which continuously record the pH of said tanks.

21. The installation according to claim 19, wherein the cation exchanger is also connected to a rinse water tank; and the waste water, treated water and regenerating solution tanks, as well as the voltameter being provided with closed loop recirculation circuits.

* * * * *